United States Patent [19]
Santos

[11] Patent Number: 5,601,479
[45] Date of Patent: Feb. 11, 1997

[54] METHOD AND APPARATUS FOR DECONTAMINATING STRUCTURES

[76] Inventor: Eugene W. Santos, 106 Canvasback La., Suite A, Summerville, S.C. 29483

[21] Appl. No.: 314,236

[22] Filed: Sep. 28, 1994

[51] Int. Cl.$^6$ ...................................................... B24C 9/00
[52] U.S. Cl. ............................... 451/87; 451/322; 451/88
[58] Field of Search ................................ 451/87, 88, 92, 451/75, 76, 39, 2

[56] References Cited

U.S. PATENT DOCUMENTS

| | | | |
|---|---|---|---|
| 3,705,437 | 12/1972 | Rukavina et al. | 15/302 |
| 3,816,785 | 6/1974 | Miller | 313/615 |
| 3,828,390 | 8/1974 | Carter | 15/321 |
| 4,075,733 | 2/1978 | Parise et al. | 15/322 |
| 4,375,740 | 3/1983 | Brown | 451/88 |
| 4,521,935 | 6/1985 | Johnston et al. | 15/322 |
| 4,608,062 | 8/1986 | Hughes | 55/186 |
| 4,646,482 | 3/1987 | Chitjian | 451/87 |
| 4,648,214 | 3/1987 | Brull et al. | 451/88 |
| 4,993,200 | 2/1991 | Morioka et al. | 451/92 |

FOREIGN PATENT DOCUMENTS 091018712  12/1991  WIPO ...................................... 451/87

OTHER PUBLICATIONS

Pentek's Dustless Decontamination And Surface Preparation System, Nov., 1991.
Pentek, Inc. Special Lead Abatement Issue, 1992.
The Kelly Decontamination System, 1987.

*Primary Examiner*—Bruce M. Kisliuk
*Assistant Examiner*—Derris Banks
*Attorney, Agent, or Firm*—Daniel J. Santos

[57] ABSTRACT

A method and apparatus for decontaminating structures which utilizes abrasive blasting in conjunction with a reverse air flow to remove contaminants from a structure. The apparatus comprises an abrasive blasting device for projecting abrasive material through a nozzle onto a structure at a high velocity. An enclosure is connected to the blasting device which surrounds the nozzle and forms a vacuum envelope around the nozzle and a portion of the structure being decontaminated. A vacuum apparatus is connected to the enclosure for providing a reverse air flow from the enclosure to a collection chamber in the vacuum. A high pressure pump/motor assembly delivers abrasion material at high pressure from a hopper to the blasting device. As contaminants are abraded from the structure, the reverse air flow provided to the enclosure causes the abrasive material and the material abraded from the structure to be collected in the collection chamber. A radiation detecting device which measures neutron activity is located in the collection chamber. The radiation detection device is electrically coupled to a decade meter which measures the rate of increase of neutron activity in the collection chamber. When the rate of increase of neutron activity exceeds a preselected threshold level, a poison injection device injects a poison into the chamber which decreases neutron activity and a warning signal is provided to the operator.

6 Claims, 2 Drawing Sheets

METHOD AND APPARATUS FOR DECONTAMINATING STRUCTURES

BACKGROUND OF THE INVENTION

The present invention relates to a method and apparatus for decontaminating structures and, more particularly, to an apparatus which projects a non-hazardous abrasive onto the surface of a contaminated structure at a velocity sufficient to remove a layer of the base material from the structure and which immediately reclaims the abrasive material projected onto the structure and the base material removed from the structure.

A major problem now exists in this country with respect to the reuse of sites which were once used to store hazardous materials. The costs associated with remediating these sites can be astronomical. Moreover, once such sites have been remediated, they still may not be suitable for other uses. The Comprehensive Environmental Response, Compensation and Liability Act (CERCLA) generally governs the cleanup of hazardous sites which have been ranked among the most dangerous sites in the country by the Environmental Protection Agency (EPA). These sites are placed on the national priorities list to ensure that they are among the first to be remediated. After a particular site has been listed, the EPA (usually in conjunction with the state where the site is located) determines the type of remediation to be used. In determining what type of remediation is to be used, the EPA looks at several different alternatives and selects the best one based on the consideration of nine criteria: (1) overall protection of human health and the environment; (2) compliance with or waiver of applicable or relevant and appropriate other environmental laws; (3) long-term permanence and effectiveness; (4) reduction of toxicity, mobility, or volume through treatment; (5) short-term effectiveness; (6) implementability; (7) cost; (8) acceptance of the proposed plan by the state; and (9) acceptance of the proposed plan by the affected community.

Although cost is one of the nine criteria considered in selecting a remedial plan, cost usually does not play a major role in the selection and the importance of the other criteria is emphasized. Therefore, it is important to provide a means by which a site, or a particular aspect thereof, can be remediated which meets these criteria and which is cost effective.

Until the present invention, there has been no suitable means for decontaminating structures, such as buildings, which were once used to store or treat hazardous materials. The present invention provides an apparatus which utilizes abrasive blasting effectuated by a nozzle encompassed in a vacuum envelope which allows a layer of the base material of a structure (e.g., a wall, ceiling or floor) to be removed and immediately reclaimed in the vacuum envelope. The abrasive material to be used is preferably non-hazardous and is reclaimed with the removed base material in the vacuum envelope. By immediately reclaiming the abrasive and the removed base material, the need for a secondary cleanup is eliminated or minimized.

In accordance with the present invention, the abrasive material to be used is preferable dry ice. Dry ice is a non-hazardous substance, which results in reduction of the volume of the end product needed to be treated. Also, dry ice has the abrasive characteristics necessary to effectuate removal of a layer of the base material. Although dry ice has been used in other industries as an abrasive, its particular suitability for remediation, in conjunction with the concepts of the present invention, has not until now been proposed.

It has been known in the industry to use devices which decontaminate structures (e.g., removal of lead-based paint) by utilizing pneumatically operated cutting needles encompassed within a stainless steel enclosure. The device is used in combination with a vacuum. The stainless steel enclosure is designed to prevent the release of dust, debris and airborne contamination into the environment. A shroud which is provided on the end of the device helps to direct the reverse airflow created by the vacuum so that debris removed from the structure is immediately collected. However, such a device is generally not suitable for the removal of particular types radioactive material, such as those characterized by neutron activity which may result in the collected material approaching critical mass. One of the primary objects of the present invention is to provide detection means in the vacuum which will warn of neutron activity indicating that the possibility of critical mass is approaching.

Abrasive blasting has also been used in the industry for decontaminating structures. However, open abrasive blasting operations generate dispersions which may be harmful to the operator and others in the surrounding area. Containment structures have been used in conjunction with abrasive blasting. However, such structures require the operator to be located within the containment area while blasting the surface, which may produce adverse health consequences to the operator such a device is generally not suitable for decontaminating structures contaminated with high levels of particular types of radioactive material.

It is also known in the industry to use super-heated water in combination with a spray vacuum to decontaminate surfaces. The super-heated water is in liquid state as it strikes the surface. The impact and temperature of the water cleans the surface and the vacuum collects the water and the material removed from the surface. The present invention proposes the removal of not only the contaminated material from a structure but also the removal of a layer of the base material of the structure itself. A layer of base material should be removed as well as the contaminant due to migration of the contaminant into the base material. The use of super-heated water does not result in removal of a layer of the base material and therefore, will not be suitable for removal of particular types of contaminants.

Therefore, a need exists in the industry for a decontamination device which utilizes abrasive blasting and which is capable of removing hazardous contaminants, such as radioactive contaminants, from structures and immediately reclaiming the contaminants as well as the abrasive.

SUMMARY OF THE INVENTION

The present invention is particularly well suited for the removal of tightly adherent radioactive contamination, although it is not limited to the removal of radioactive contamination. In accordance with the present invention, a layer of the base material of a structure is removed by abrasive blasting and the abrasive material and the removed base material are immediately reclaimed by utilizing a vacuum envelope technique. The vacuum apparatus preferably contains a radiation detector for detecting when radiation levels have exceeded a certain level, at which time the operator ceases operation of the device. Certain types of radioactive isotopes, such as plutonium, are neutron emitters. Other types of radioactive materials emit alpha, beta and gamma particles. There has been a major problem in the industry with respect to the decontamination of structures which are contaminated with materials which emit neutrons.

This is because removal of such materials may result in approaching a mass great enough to cause criticality.

The present invention utilizes a radiation detector, such as a neutron detector, located in the vacuum chamber for measuring neutron activity. The neutron detector is connected to a decade meter which measures the rate of increase of radiation. The decade meter is connected to an alarm which notifies the operator that the material contained in the vacuum apparatus is approaching a mass great enough to cause criticality. The vacuum apparatus may also be equipped with a poison addition device which is automatically engaged if the decade meter threshold level is exceeded. Once the level is exceeded, the poison addition device automatically injects poison, such as a boron compound, into the collected end product, thereby reducing neutron activity.

Accordingly, it is an object of the present invention to provide a method and apparatus for decontaminating structures which utilize abrasive blasting in combination with a vacuum apparatus.

It is also an object of the present invention to provide a method and apparatus for removing radioactive material from structures where such radioactive material is a neutron emitter.

It is yet another object of the present invention to provide a method and apparatus for decontaminating structures wherein the apparatus is equipped with a radiation detection apparatus and a means for warning an operator that the end product collected is approaching a mass great enough to cause criticality.

It is yet another object of the present invention to provide a method and apparatus for decontaminating structures by removing a layer of the base material of the structure.

It is yet another object of the present invention to provide a cost-effective method and apparatus for remediating hazardous sites.

These and other objects of the present invention will become apparent from the specification, drawings and claims.

DETAILED DESCRIPTION OF THE INVENTION

Figure 1A:
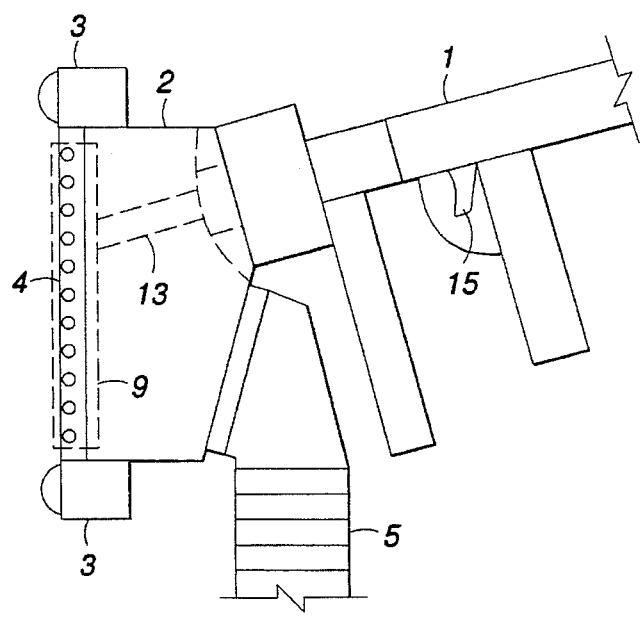
FIG. 1a illustrates a preferred embodiment of the blasting device of the decontamination apparatus of the present invention wherein the blasting device is intended to be operated manually.

FIG. 1 illustrates a preferred embodiment of the blasting device of the present invention. A high pressure abrasion gun 1 is used to remove contaminated material from a structure. The abrasion gun 1 receives the abrasive, preferably dry ice, which is pumped into the gun at high pressure. The high pressure abrasion gun 1 is coupled to a transparent Plexiglas or plastic enclosure 2 which functions as the vacuum envelope. The dispersion nozzle of the gun 13 is contained within the vacuum envelope. The front 4 of enclosure 2 is equipped with a flexible rubber edge. The side edge of the front 4 of the enclosure 2 has air holes formed therein for facilitating the reverse air flow generated by the vacuum (item 8 in FIG. 2). The rubber edge of front 4 of the enclosure 2 provides a loose suction fit between the abrasion apparatus and the structure being decontaminated (not shown). A skirt 9 located around enclosure 2 prevents the end material (i.e., abrasive+layer of base material+contaminant) from exiting through the air holes. A vacuum hose 5 connected to enclosure 2 pulls the end product (not shown) into the vacuum apparatus 8.

Figure 1B:
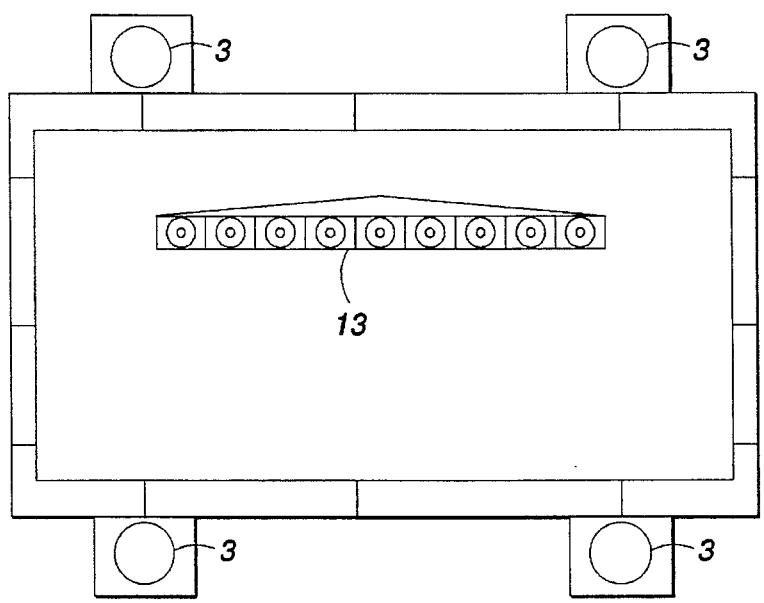
FIG. 1b illustrates a front view of the vacuum envelope of the decontamination apparatus of the present invention.
Figure 1C:
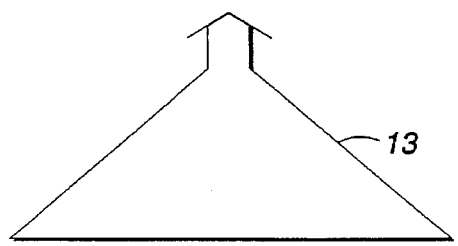
FIG. 1c illustrates a top view of the dispersion nozzle of the decontamination apparatus of the present invention.

As shown in FIG. 1b, a set of micro switches 3 are engaged when the abrasion device is placed flush against the structure. The decontamination apparatus will not operate unless all of the micro switches are engaged and trigger 15 is depressed. Although the micro switches 3 are not necessary, they comprise a fail-safe mechanism which prevents operation of the decontamination apparatus unless the front 4 of the enclosure 2 is flush against the structure being decontaminated. The balls of the micro switches allow smooth, rolling movement along the structure being decontaminated. FIG. 1c illustrates one embodiment of the dispersion nozzle 13 located within enclosure 4, as shown in FIG. 1b. Many different designs can be selected for the dispersion nozzle 13 to provide the desired projection and velocity of the abrasive onto the structure being decontaminated.

Figure 2:
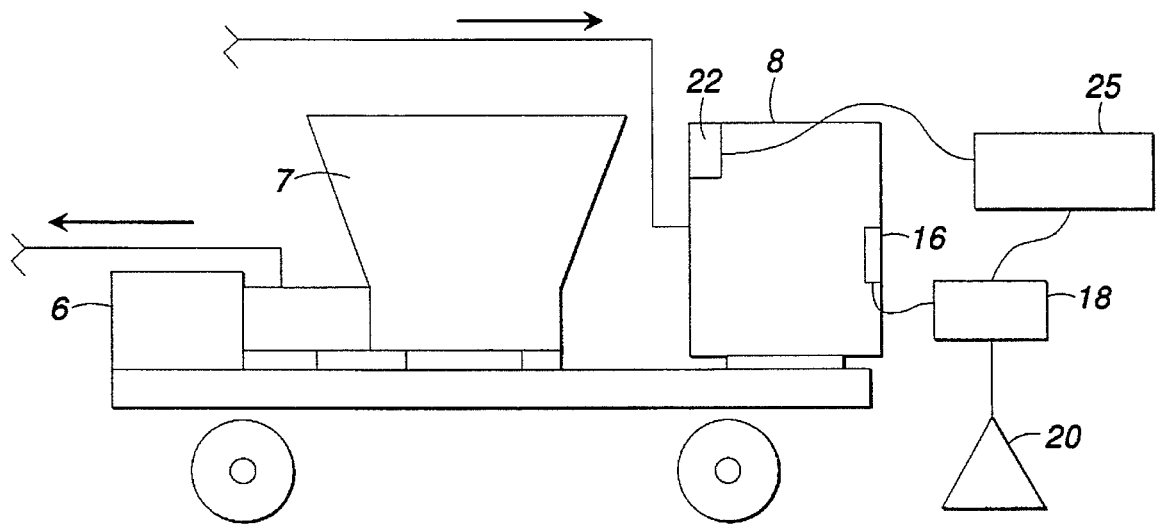
FIG. 2 illustrates a schematic diagram of the hopper and vacuum device of the decontamination apparatus of the present invention.

FIG. 2 illustrates a schematic diagram of the hopper and vacuum device of the decontamination apparatus of the present invention. As the abrasive (not shown) is added to the hopper 7, a high-pressure pump/motor assembly 6 causes the abrasive to be pumped to the blasting device. As material is removed from the structure being decontaminated, vacuum apparatus 8 collects the abrasive and the material removed from the structure. Preferably, the hopper is automatically fed, but it may be manually fed as well. The pump/motor assembly 6 only operates when the micro switches 3 are engaged and the trigger 15 is depressed. A radiation detector 16 located within vacuum 8 measures radioactivity and the aggregate level of radiation within vacuum 8. The radiation detector 16 may be connected to a decade meter 18 which measures the rate of change neutron activity within the vacuum 8. The decade meter may be connected to a warning device 20 which warns the operator that the end product in the vacuum may be approaching a mass great enough to cause criticality. Such a detection and warning system is extremely important when decontaminating a structure contaminated with neutron-emitting radioactive isotopes, such as plutonium. However, certain radioactive materials, such as gamma or beta emitters, do not emit neutrons and therefore, there is no danger of the collected end material approaching critical mass. The warning and detection system is only needed where the contaminant is a neutron-emitting radioactive isotope.

Figure 3:
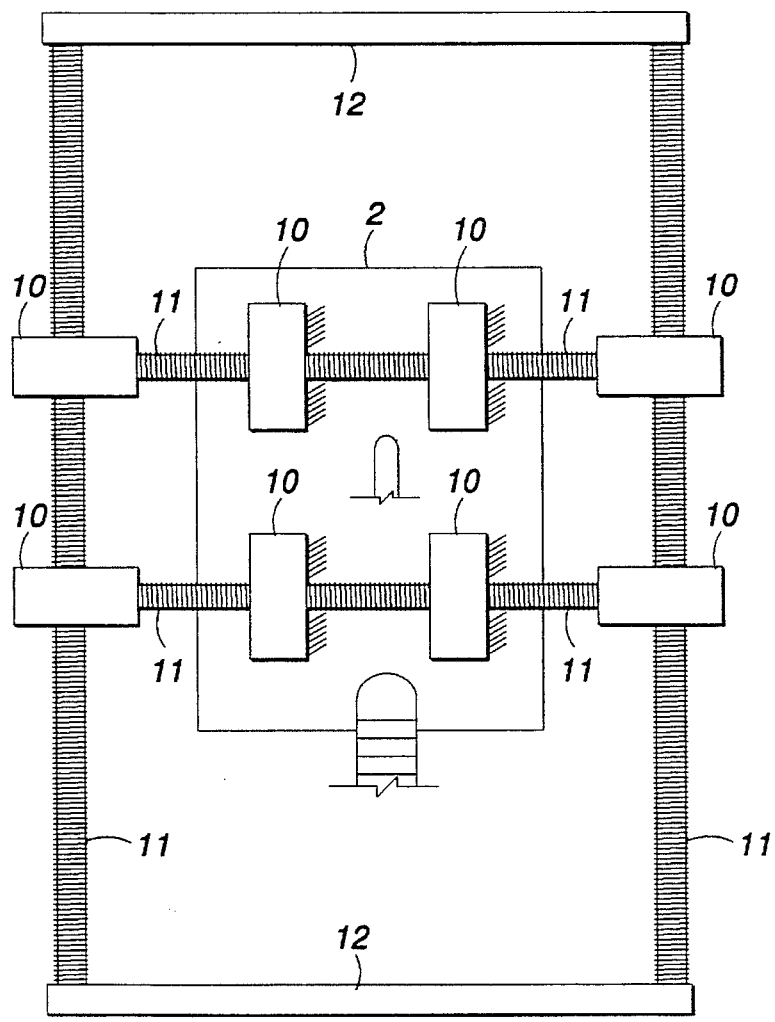
FIG. 3 illustrates an alternative embodiment of the blasting device of the decontamination apparatus of the present invention wherein the blasting device is intended to be operated automatically.

Preferably, a poison addition device 22 is also provided in the vacuum chamber. The poison addition device 22 automatically injects a neutron-absorbing compound into the vacuum 8 to reduce neutron activity. The poison addition device is activated when neutron activity exceeds a preselected threshold level. A suitable boron compound may be used as the poison due to its relatively high neutron absorbing cross section. In accordance with a preferred embodiment, the detection device 16, the poison addition device 22, the decade meter 18, the warning device 20, the pump/motor assembly 6 and the micro switches 3 are all electrically coupled to a central control unit 25 which controls all of the automatic operations of the decontamination apparatus. FIG. 3 illustrates a schematic diagram of an alternative embodiment of the abrasive blasting device of the present invention. The enclosure 2 and the nozzle 13 can be of the type discussed above with respect to FIGS. 1a–1c. The blasting device of FIG. 3 is comprised of a support structure 12, motion control motors 10 and tracks 11 for the motion control motors. Once the blasting apparatus is placed against the structure to be decontaminated, the motion control motors 10, which can be electrically controlled by an operator or central control unit 25, move the enclosure 2 in the x and y directions along tracks 11. The abrasive blasting and end product collection are essentially the same as that provided by the abrasive blasting apparatus of FIGS. 1a–1c.

Although the present invention has been described with respect to particular embodiments, the present invention is not intended to be limited to these embodiments. It will be apparent to those skilled in the art that the concepts of the present invention can be embodied in a variety of different forms which accomplish the goals of the present invention and which are consistent with the spirit and scope of the present invention.

What is claimed is:

1. An apparatus for decontaminating structures, said apparatus comprising:

an abrasive blasting device for projecting abrasive material onto a structure, said blasting device comprising means for receiving abrasive material pumped into said blasting device at a preselected pressure, said means for receiving abrasive material mechanically coupled to a nozzle such that the abrasive material received by said receiving means is directed to said nozzle at a preselected pressure, thereby causing the abrasive material to be projected from said nozzle at a high rate of speed onto a portion of a structure being decontaminated to abrade a layer of base material from said structure, whereby contaminated material along with the layer of base material is removed from the structure;

pumping means mechanically coupled to said means for receiving the abrasive material, said pumping means comprising means for delivering the abrasive material at a preselected pressure to said means for receiving abrasive material;

enclosure means mechanically coupled to said abrasive blasting device, said enclosure means encompassing at least said nozzle for forming a vacuum envelope around said nozzle and the portion of the structure upon which the abrasive material is being projected;

vacuum means mechanically coupled to said enclosure means for providing a reverse air flow in said enclosure means such that any base material abraded from the structure, any contaminated material removed along with the layer of base material and the abrasive material projected onto a portion of the structure within the vacuum envelope is reclaimed by said vacuum means;

a collection chamber mechanically coupled to said vacuum means for receiving and storing the reclaimed material abraded from the structure and the abrasive material projected onto the structure;

a radiation detector located in said collection chamber for detecting radiation and for determining when a predetermined radiation level has been reached or exceeded and for outputting a warning signal when the predetermined radiation level has been reached or exceeded; and switching means electrically coupled to said pumping means for controlling the operation of said pumping means and thereby controlling the delivery of the abrasive material from said pumping means to said means for receiving abrasive material.

2. An apparatus for decontaminating structures according to claim 1 wherein said radiation detector comprises means for detecting neutron activity.

3. An apparatus for decontaminating structures according to claim 2 wherein said means for detecting neutron activity and for warning an operator includes a decade meter.

4. An apparatus for decontaminating structures according to claim 3 wherein said means for detecting neutron activity is electrically coupled to a poison injection device which injects a poison into said collection chamber to reduce neutron activity when the amount of neutron activity measured by said means for detecting neutron activity exceeds a preselected threshold level.

5. An apparatus for decontaminating structures according to claim 1 wherein said blasting device is operated manually.

6. An apparatus for decontaminating structures according to claim 1 wherein said blasting device is automatically operated.

* * * * *